(No Model.)

W. H. MULLINS.
BAKING PAN.

No. 593,949. Patented Nov. 16, 1897.

WITNESSES
Edwin L. Bradford
G. H. McPherson Jr.

INVENTOR
W. H. Mullins,
BY
Wm. E. Dyre.
ATTORNEY

UNITED STATES PATENT OFFICE.

WILLIAM H. MULLINS, OF SALEM, OHIO.

BAKING-PAN.

SPECIFICATION forming part of Letters Patent No. 593,949, dated November 16, 1897.

Application filed March 17, 1897. Serial No. 627,968. (No model.)

*To all whom it may concern:*

Be it known that I, WILLIAM H. MULLINS, a citizen of the United States, residing at Salem, in the county of Columbiana and State of Ohio, have invented certain new and useful Improvements in Baking-Pans; and I do hereby declare the following to be a full, clear, and exact description of the invention, such as will enable others skilled in the art to which it appertains to make and use the same.

My invention relates to culinary utensils in general, but has particular reference to pans adapted for baking bread or other articles of food in manner and form as exemplified by United States Letters Patents No. 313,092, at present owned by me, and No. 563,675, issued to me on the 7th day of July, 1896.

More definitely stated, the present invention contemplates and includes corresponding pan-sections adapted to form a rectangular covered or double baking-pan completely surrounded by a series of transverse corrugations or projections, as specified in the patents above mentioned; also, means for supporting said pan upon one of its angles during use, thus presenting a minimum contact or supporting surface to direct engagement with the oven, suitable bails being shown for this purpose and for purposes of interlocking the pan-sections; also, the production of corresponding pan-sections with rapidly-converging sides, which nest with the greatest economy of space during transportation or storage, and also the production of a pan which in operative position presents a maximum crusting-surface and which when used with others in an oven insures complete circulation of heat about and between them.

This invention has for its object, therefore, the manufacture of baking-pans designed, arranged, and adapted to produce a superior article of bread-food, cake, or puddings in a manner both economical and proof against scorching or burning in the oven; a product the nutritious values and flavors whereof shall be inclosed and confined by a completely and uniformly encrusted surface; a loaf configured by a series of surrounding corrugations or crimps serving to increase its crusting area and to indicate points of slicing with accuracy, and also a rectangular loaf which will most readily clear itself from the pan when baked, presenting a symmetrical and most convenient shape for table use.

The invention will be hereinafter particularly described, and pointed out in the claims following.

Figure 1:
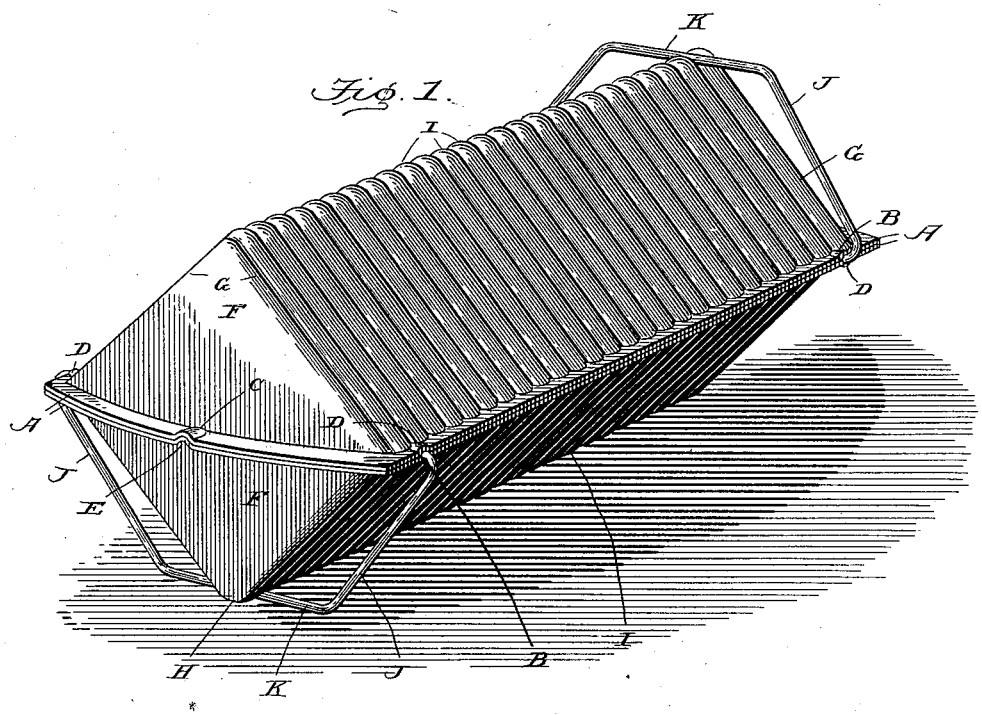
Figure 2:
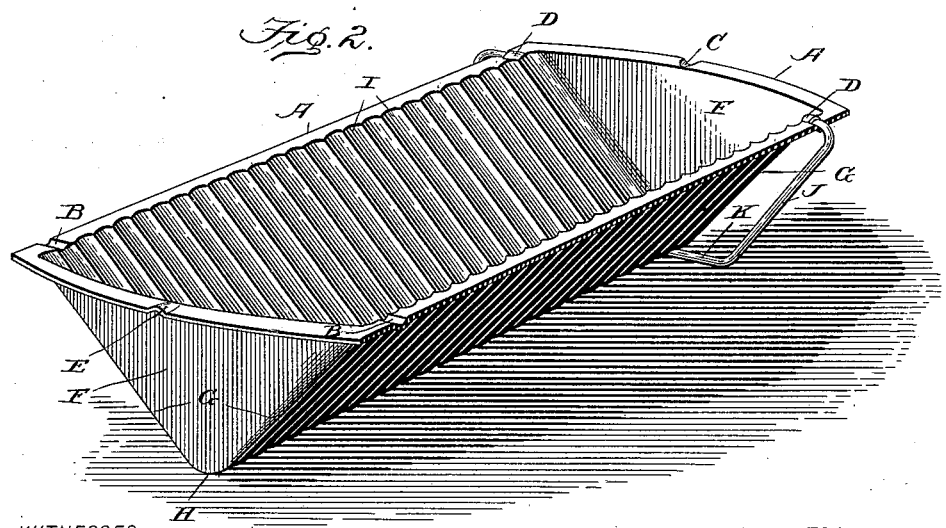

In the accompanying drawings, which form part of this specification and whereon like letters of reference indicate corresponding parts in both views, Figure 1 represents in perspective my improved form of double baking-pan, the sections being properly assembled, interlocked, and supported for use; and Fig. 2 is a corresponding view showing one pan-section with its bail folded under to constitute a foot for maintaining the pan in an upright position.

Reference being had to the drawings and letters thereon, it will be observed that a double or quadrangular pan, as illustrated by Fig. 1, is composed of two interchangeable and corresponding sections or pans divided by a plane extending through opposing angles of the figure, as shown by Fig. 2, and for this reason one only of said sections or single pans need be herein specifically described. These pan-sections are preferably blanked from a single piece of relatively stiff sheet metal and finished by the operation of suitable steel shaping-dies.

As most clearly shown by Fig. 2, the letter A indicates a horizontal surrounding rim, the surface whereof is broken by depressions B B and C as also by projecting lugs D D and E, for purposes that will later appear.

Integral with the rim A are angular end walls F F and convergent sides G G, which latter combine to form an angular contact or supporting surface H at their line of intersection. These sides G G are configured by a series of transverse corrugations or crimps I I, individually extending from side to side of rim A and collectively covering the entire space between ends F F, as shown.

Journaled in the projecting lugs D D on opposite sides of rim A is a bail J of convenient form, having a horizontal foot K, adapted to swing beneath the end of contact or supporting surface H and interlock with its corrugations I. By preference this bail is made of spring-wire to facilitate its coaction with the corrugations I aforesaid and is of the form shown for convenience of handling, packing, or storage, though obviously its character and shape do not enter into the spirit of the invention.

As thus far described the invention is operative and constitutes a single or open baker. When, however, it is desired to use the pan in its preferred arrangement, the pan-section last described is merely inclosed or covered by a second inverted duplicate section, as shown by Fig. 1. In this relation it will be observed that the surrounding flanges A A of each section or pan abut, the projecting lugs D D and E of one pan-section engaging the corresponding depressions B B and C of the other, thus preventing independent movement of either section and insuring complete registration of the corrugations I in both. This accomplished, the two sections may be securely interlocked by means of the bails J J, journaled in lugs D D of each. These being swung in opposite directions over the end of adjacent pan-sections are then seated between two of the corrugations I thereof and retained by their inherent spring action. The end corrugations I and several adjacent thereto thus serve in the capacity of a rack, over which the foot K of spring-bails J may be advanced to permit degrees of closeness or tightness with which the pan-sections may be interlocked and bound together, while at the same time it will be noted that bail J of the upper pan-section or cover passing beneath the lower pan-section, as described, performs the additional and important function of maintaining the entire pan upon its contact or supporting surface H when in use.

This being substantially a description of my present invention in its preferred form of construction an example of its use and operation is as follows: A baking of dough placed in the lower pan-section may be covered by an upper pan-section, the two interlocked, as described, and subjected to the heat of an oven. Rising in the usual manner the dough aforesaid first hermetically seals the parting-line of the pans between their rims A A, thus closely confining and retaining every virtue of the flour during the process and subjecting the loaf to a combined baking and steaming action. Rising farther the confined dough proceeds to mold itself into all corrugations I of both pan-sections and is correspondingly configured, as and for purposes heretofore stated. A loaf having been thus baked may readily be released by the removal of interlocking bails J and separation of the pan-sections. It will then be found incased in a uniform crisp crust surrounded by parallel transverse corrugations, which serve as guides in the matter of slicing.

Having thus fully described my invention, I claim and desire to secure by Letters Patent—

1. A baking-pan having convergent sides, angular ends, and a minimum contact or supporting surface formed by the intersection of said sides, in combination with means for maintaining the pan in an upright position, substantially as described.

2. A quadrangular baking-pan formed of corresponding sections divided by a plane extending through opposing angles of the figure, in combination with means for supporting said pan upon one of its angles, substantially as described.

3. A rectangular baking-pan formed of corresponding sections each configured by a series of transverse corrugations, in combination with means for supporting the pan upon one of its angles, substantially as described.

4. A rectangular baking-pan formed of corresponding sections each configured by a series of transverse corrugations, in combination with a swinging bail for supporting the pan upon one of its angles, substantially as described.

5. A rectangular baking-pan formed of two interchangeable sections, in combination with a horizontal rim surrounding each section, registering lugs and depressions on the meeting faces of said rims, and a bail pivoted upon each section for interlocking them and supporting the pan upon one of its angles, substantially as described.

In testimony whereof I subscribe my signature in presence of two witnesses.

WILLIAM H. MULLINS.

Witnesses:
  WM. E. DYRE,
  ELLWOOD M. DAVIS.